United States Patent
Tan et al.

(10) Patent No.: US 8,208,786 B2
(45) Date of Patent: Jun. 26, 2012

(54) PORTABLE STORAGE DEVICE FOR RECORDING AND PLAYING BACK DATA

(75) Inventors: Henry Tan, Singapore (SG); Teng Pin Poo, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 1378 days.

(21) Appl. No.: 10/586,070

(22) PCT Filed: May 20, 2004

(86) PCT No.: PCT/SG2004/000141
§ 371 (c)(1),
(2), (4) Date: Jul. 14, 2006

(87) PCT Pub. No.: WO2005/069614
PCT Pub. Date: Jul. 28, 2005

(65) Prior Publication Data
US 2008/0212940 A1 Sep. 4, 2008

(30) Foreign Application Priority Data

Jan. 16, 2004 (SG) ................. 200400358-8

(51) Int. Cl.
*H04N 5/765* (2006.01)
*H04N 5/917* (2006.01)
*B60Q 1/54* (2006.01)
*G06F 15/16* (2006.01)

(52) U.S. Cl. ........ 386/232; 386/200; 386/231; 386/328; 386/355; 370/466; 709/246

(58) Field of Classification Search ............ 386/46, 386/83, 131, 200–232, 326–342, 353–357; 370/466; 709/246
See application file for complete search history.

(56) References Cited

U.S. PATENT DOCUMENTS
5,511,000 A 4/1996 Kaloi et al.
(Continued)

FOREIGN PATENT DOCUMENTS
CN 1389075 1/2003
(Continued)

OTHER PUBLICATIONS

Sony Digital Video Camera Recorder DCR-IP45E, Sony Corporation 2002 (http://pdf.crse.com/manuals/3075460121.pdf).

*Primary Examiner* — Thai Tran
*Assistant Examiner* — Hung Dang
(74) *Attorney, Agent, or Firm* — Fredrikson & Byron, P.A.

(57) ABSTRACT

The present invention provides a device for recording and playing back audio/video signals. A portable storage device (11) has mounted thereon a portable storage device connector (13) of a first type adapted to transfer audio/video signals of a first type (15). A first audio/video system (17) has a first audio/video system connector (19) of the first type for directly connecting to the portable storage device connector (13) to exchange audio/video signals of the first type (15) between the portable storage device (11) and the first audio/video system (17) to record and playback audio/video signals of the first type (15). A second audio/video system (21) receives audio/signals of a second type (23). An interface section (25) has an interface section connector (27) of the first type for directly connecting to the portable storage device (11). The interface section (25) converts between the audio/video signals of the first (15) and second type (23), and exchanges the signals of the first and second type between the first audio/video system (17) and the second audio/video system (21) through the interface section connector (13) of the first type and a signal connection (29) between the interface section (25) and the second audio/video system (21).

31 Claims, 4 Drawing Sheets

U.S. PATENT DOCUMENTS

| | | | |
|---|---|---|---|
| 5,572,442 | A | 11/1996 | Schulhof et al. |
| 6,169,879 | B1 | 1/2001 | Perlman |
| 6,253,183 | B1 | 6/2001 | Boucard |
| 6,477,312 | B1 | 11/2002 | Houston |
| 6,512,722 | B2 * | 1/2003 | Kumagai .................. 369/30.05 |
| 7,355,624 | B2 * | 4/2008 | Soundararajan ........... 348/14.13 |
| 2001/0039603 | A1 | 11/2001 | Manowitz |
| 2002/0057893 | A1 | 5/2002 | Wood et al. |
| 2002/0164156 | A1 | 11/2002 | Bilbrey |
| 2002/0199042 | A1 | 12/2002 | Kim et al. |
| 2003/0005337 | A1 * | 1/2003 | Poo et al. ...................... 713/202 |
| 2003/0110297 | A1 * | 6/2003 | Tabatabai et al. ............. 709/246 |
| 2003/0174167 | A1 | 9/2003 | Poo et al. |
| 2003/0194206 | A1 | 10/2003 | Peters et al. |
| 2005/0063418 | A1 * | 3/2005 | Case ........................... 370/466 |

FOREIGN PATENT DOCUMENTS

| | | |
|---|---|---|
| EP | 1661131 | 3/2005 |
| EP | 1668883 | 4/2005 |
| JP | 2-158992 | 6/1990 |
| JP | 4-319595 | 11/1992 |
| JP | 8-298610 | 11/1996 |
| JP | 10-145810 | 5/1998 |
| JP | 11-25599 | 1/1999 |
| JP | 11-65722 | 3/1999 |
| JP | 2001-118046 | 4/2001 |
| JP | 2001-282699 | 10/2001 |
| JP | 2002-51294 | 2/2002 |
| JP | 2002-354387 | 12/2002 |
| WO | WO 01/23987 | 4/2001 |
| WO | 03003282 | 1/2003 |
| WO | 03107672 | 12/2003 |

* cited by examiner

US 8,208,786 B2

PORTABLE STORAGE DEVICE FOR RECORDING AND PLAYING BACK DATA

RELATED APPLICATIONS

This application claims priority to International Application No. PCT/SG2004/000141filed May 20, 2004, and Singapore patent application No. 200400358-8, filed Jan. 16, 2004, the teachings of both of which are incorporated herein by reference

BACKGROUND OF THE INVENTION

1. Field of the Invention

The present invention relates generally to the recording, storage, and playing back of audio and video data.

2. Description of the Related Art

VHS, VCD and DVD players provide the current standards for connecting to televisions for the playback and recording of audio/video formats. These systems require tape or disk media and a specific recorder/player to encode or decode the various audio/video formats. However, the technology for the media keeps changing and also the encoding and decoding methods keep changing.

It would be desirable to have a recording/playback media incorporating a standard USB interface that would be compatible with consumer electronics products (such as televisions) as well as PC products. It would be desirable for the media to be programmable by the user to allow the flexibility of changing the encoding and decoding of audio/video formats. Such a media would eliminate the incompatibility of media with players and the incompatibility of the audio/video formats the with the player system.

In particular, the High-Definition Multimedia Interface (HDMI) Standard is positioned to become the dominant standard in the consumer electronics sector. The HDMI Standard is defined in the "High-Definition Multimedia Interface Specification, Informal Version 1.0", published Sep. 4, 2003. It would be especially desirable to provide a media for providing compatibility between this HDMI consumer electronics standard and computer standards such as USB.

SUMMARY OF THE INVENTION

The present invention solves the incompatibility problem of media with players and the incompatibility of the audio/video formats with the player system. The present invention allows solid state media to cross the PC boundary to products of the consumer sector, such as television, which use standards such as HDMI.

In general terms, the present invention provides a device for recording and playing back audio/video signals. A portable storage device has mounted thereon a portable storage device connector of a first type adapted to transfer audio/video signals of a first type. A first audio/video system has a first audio/video system connector of the first type for directly connecting to the portable storage device connector to exchange audio/video signals of the first type between the portable storage device and the first audio/video system to record and playback audio/video signals of the first type. A second audio/video system receives audio/video signals of a second type. An interface section has an interface section connector of the first type for directly connecting to the portable storage device. The interface section converts between the audio/video signals of the first and second type, and exchanges the signals of the first and second type between the first audio/video system and the second audio/video system through the interface section connector of the first type and a signal connection between the interface section and the second audio/video system.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A portable storage device for connecting to both a television and a computer for recording and playing back audio and video signals and a method for doing the same are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
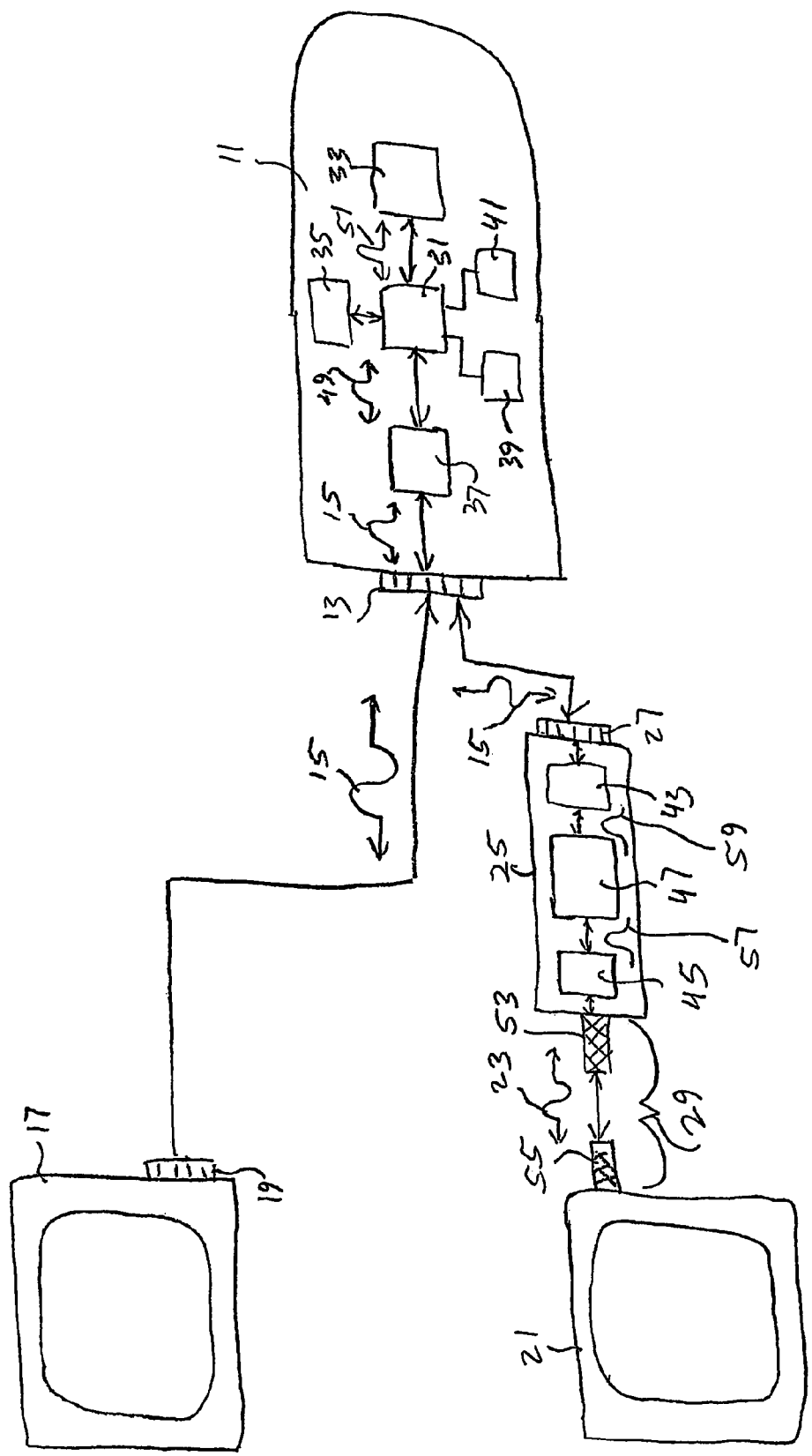
FIG. 1 shows a device for recording and playing back video signals of the present invention.

FIG. 1 shows a device for recording and playing back video signals of the present invention. Mounted to a portable storage device 11 is a portable storage device connector of a first type 13 adapted to transfer video signals of a first type 15. The portable storage device 11 is preferably of a size that can easily fit in the palm of a user's hand and easily fit within the user's pocket for convenient portability. The portable storage device 11 includes a memory section 33, a microcontroller unit 31, an encoder/decoder engine 35, a protocol controller 37, a key matrix 39 and a biometrics based authentication module 41. The memory section 33 can be non-volatile solid-state memory having a storage capacity of at least 8 MB. Alternatively, the memory section can be an optical drive such as a hard disk drive or another form of compact data storage.

A first video system 17 has a first video system connector of the first type 19 for directly connecting to the portable storage device connector to exchange video signals of the first type 15 between the portable storage device 11 and the first video system 17 to record and playback video signals of the first type.

A second video system 21 receives video signals of a second type 23 from an interface section 25. The interface section 25 has an interface section connector of the first type 27 for directly connecting to the connector 13 of the portable storage device 11. The interface section 25 converts between the video signals of the first type 15 and the second type 23. The interface section includes a protocol controller of the first type 43 for translating signals to and from video signals of the first type 15, a protocol controller of the second type 45 for translating signals to and from video signals of the second type 23, and an interface section microcontroller unit 47 for translating or converting between a signals of a first interface protocol type 57 and signals of a second interface protocol type 59. A signal connection 29 delivers the video signals of the second type 23 to and/or from the second video system 21. The signal connection 29 can include an interface section connector of the second type 53 which is directly connected to a second video system connector of the second type 55 for transferring video signals of the second type 23 between the second video system 21 and the interface section 25. Alternatively, rather than using a direct connection, the connectors 53, 55, the interface section 25, and the second video system 21 can be connected via an intervening cable or connected wirelessly using a protocol such as Bluetooth or using infrared.

Figure 3:
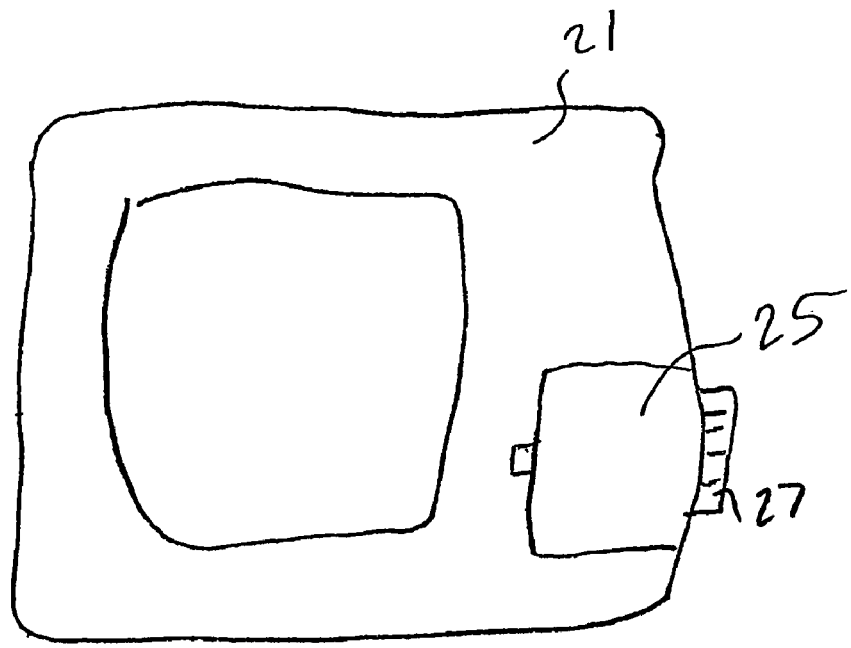
FIGS. 3 and 4 show integral configurations of an interface section integrally combined with a video system and a portable storage device, respectively.
Figure 4:
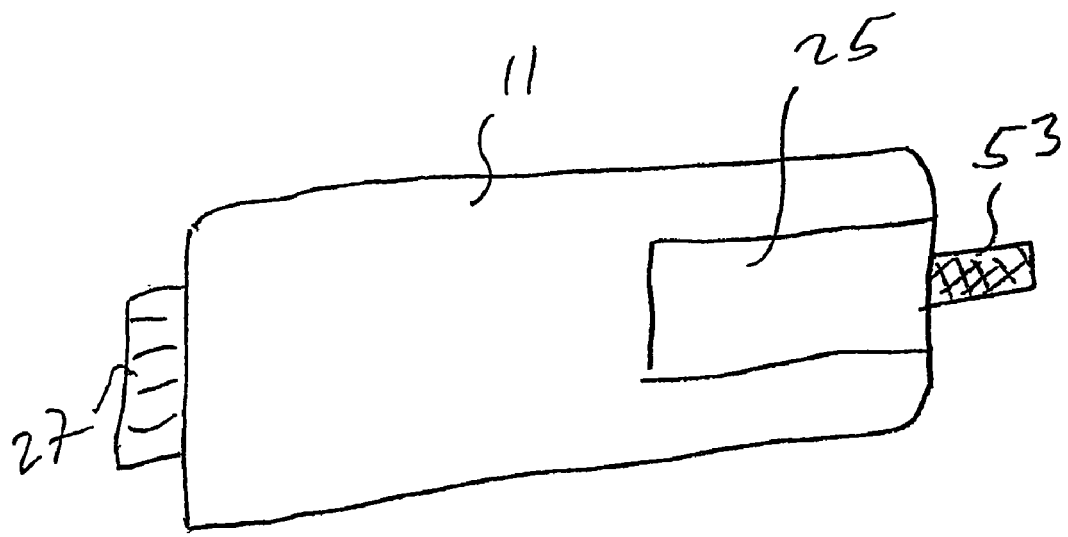

The interface section 25 can be a physically separate component (encased in a housing separate from the portable storage device 11 and the first and second video systems 17, 21) or can be integral with the second video system 21. FIG. 3 shows an example of the interface section 25 integral with the second video system 21. Alternatively, the interface section 25 can be integral with the portable storage device 11, in which case the portable storage device 11 has connectors of both the first and second type (see FIG. 4) for connecting to the first and second video systems 17, 21. In a preferred embodiment, the portable storage device 11, when in use, is not in physical or signal communication with both the first and second video systems simultaneously.

The second video system 21 can be in the same room as the first video system 17 or can be in a different room or different building. There is no limitation to the relative locations of the first and second video systems 17, 21 as long as the portable storage device 11 can be transported from the general vicinity of one to the general vicinity of the other.

Note that where video signals are mentioned above, the video signals are typically combined with audio signals in the form of audio/visual signals. Also, the first and second video systems are typically part of an audio/visual system including both audio and video. The invention can also be used with pure audio signals, in which case the first and second video systems 17, 21 can be audio systems.

Figure 2:
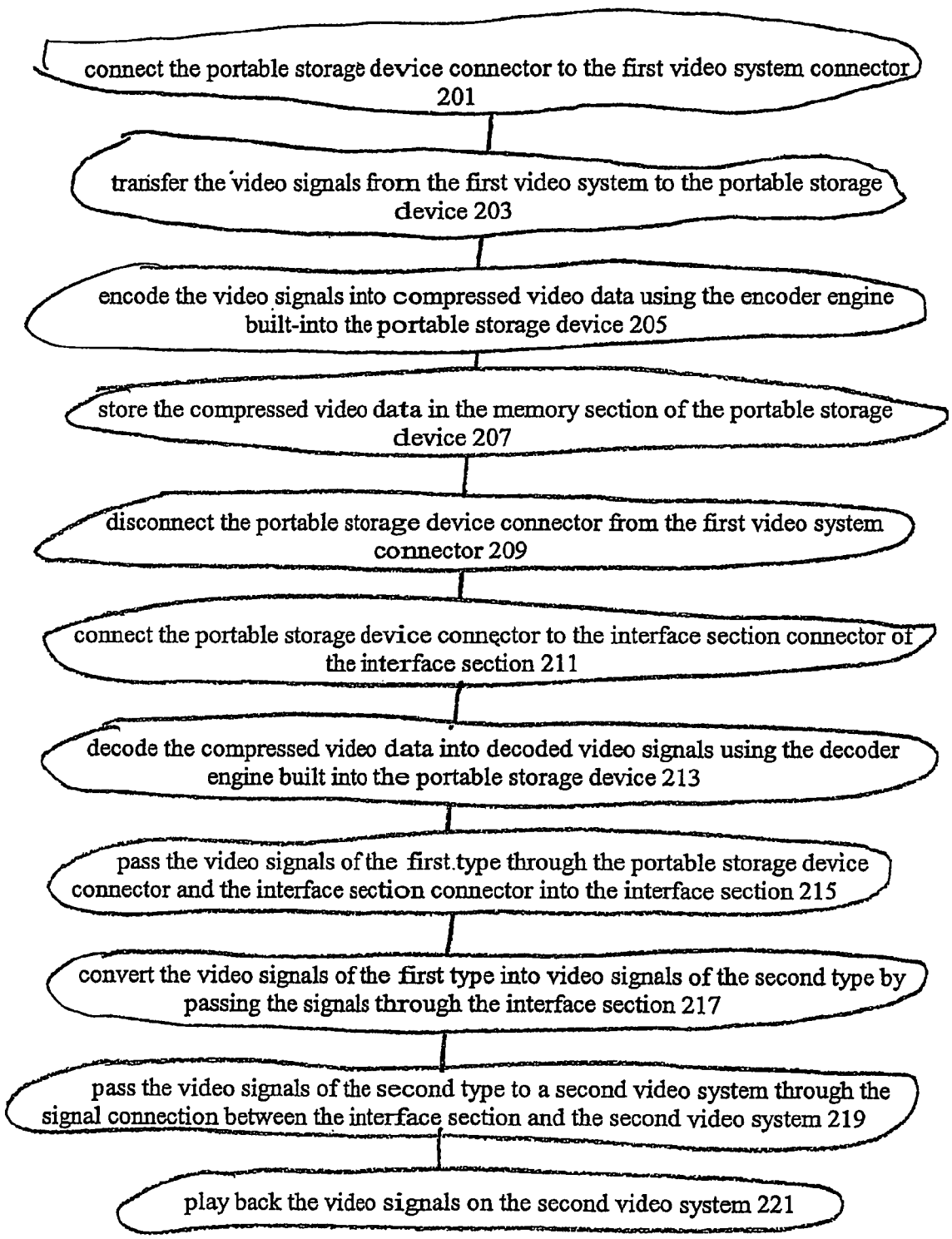
FIG. 2 is a flowchart showing the function of the present invention.

The function of the present invention is now described with additional reference to FIG. 2. At step 201, the portable storage device connector 13 is directly connected to the first video system connector 19 of the first video system 17 in order to record video data from the first video system 17. Alternatively, rather than using a direct physical connection between the connectors 13, 19, the video signals of the first type 15 can be transmitted between the portable storage device 11 and the first video system 17 using an intervening cable or wirelessly using a protocol such as Bluetooth or using infrared.

The user triggers the key matrix 39 to send a signal to the microcontroller unit 31 indicating that recording of the video data is to begin. The key matrix 39 can include keys-(buttons) for communicating with the microcontroller unit 31 for controlling recording and playback functions.

The biometrics-based authentication module 41 is coupled to and controlled by the microcontroller unit 31, and controls access to the portable storage device 11. Access to the non-volatile memory 33 of the portable storage device for playback and/or recording is granted to a user provided that the authentication module 41 authenticates the user's identity. Access to the non-volatile memory is denied to the user otherwise. The authentication module 41 can be useful for preventing a user from recording copyrighted material without paying for it. The authentication module 41 can supply biometrics or access code data to the first video system so that copyrighted material can only be recorded by an authorized user. The biometrics-based authentication module 41 can include a thumbprint sensor for acquiring data from the thumbprint of the user or can utilize other types of biometric data.

Upon selection of the record function and upon verification of the identity of the user by the authentication module 41, the step 203 is performed whereby video signals of the first type 15 are transferred from the first video system 17 to the portable storage device 11 through the first video system connector 19 and the portable storage device connector 13. The protocol controller 37 converts the video signals of the first type 15 into a data signal 49. The data signal 49 is fed into the microcontroller unit 31 which routes the data signal 49 for encoding by the encoder/decoder engine 35 built-into the portable storage device 11. Next at step 205, the encoder/decoder engine 35 encodes the video signals into compressed video data 51, which at step 207 is stored in the memory section 33 of the portable storage device. The format of the compressed data can be MPEG 1, MPEG 2, MPEG 4, MP3, MPEG 7 or MPEG 21, for example. The encoder/decoder engine 35 can be programmed through the connector 13 to encode/decode other compressed data formats as well.

At step 209 the portable storage device connector 14 is disconnected from the first video system connector 19. The video and/or audio content is thus stored in the portable storage device 11 and can be conveniently transported to the second video system 21.

At step 211 the portable storage device connector 13 is connected to the second video system 21 via the interface section 25. In one embodiment, the interface section connector 27 can be directly connected to the portable data storage device connector 13. The interface section 25 is then connected to the second video system 21 via the signal connection 29.

The user then triggers the key matrix 39 to send a signal to the microcontroller unit 31 indicating that playback of the video data stored in the memory section 33 is to begin. The biometrics-based authentication module 41 is again used, this time to prevent unauthorized access to the data stored in the memory section 33. This authorization process can again be used to protect copyrighted material from unauthorized copying.

Upon selection of the playback function and upon verification of the identity of the user by the authentication module 41, the compressed video data 51 is fed into the microcontroller unit 31 which routes the compressed video data 51 for decoding by the encoder/decoder engine 35. At step 213 the compressed video data 51 is decoded back into the data signal 49 by the encoder/decoder engine 35. The protocol controller 37 then converts the data signal 49 back into video signals of the first type 15.

At step 215 the video signals of the first type 15 are passed through the portable storage device connector 13 and the interface section connector 27 of the interface section 25.

At step 217 the interface section 25 converts the video signals of the first type 15 into video signals of a second type 23 by passing the signals through the interface section 25. At step 219 the video signals of the second type are passed to the second video system through the signal connection 29 between the interface section 25 and the second video system 21 for playback by the second video system 21 at step 221.

In a preferred embodiment the first video system 17 is a computer having a USB port. Also, the portable storage device connector 13 is a USB male-type connector, and both the first video system connector 19 and interface connector 27 are USB female-type connectors. The video signals of the first type 15 are USB protocol signals and the protocol controllers 37, 43 are USB controllers. Alternatively, other connectors and protocols used for computer connections can be used.

When the portable storage device 11 is configured to receive signals from a computer, the device 11 is not limited to receiving audio/video signals. Rather, any type of computer files can be stored to and retrieved from the memory 33 of the device 11. When such files are received, the encoder/decoder engine 35 remains deactivated. In a preferred embodiment the encoder/decoder engine 35 is only activated when recording/playback is initiated using the key matrix 39. Otherwise it is assumed the input/output to/from the portable storage device 11 is in file format that does not need to be encoded or decoded.

Alternatively, the first video system can be a television having an HDMI connector. Then the portable storage device connector 13 is a HDMI connector, the first video system connector 19 and the interface connector 27 are also HDMI connectors. The video signals of the first type 15 are HDMI protocol signals and the protocol controllers 37, 43 are HDMI interfaces. In all of the embodiments using HDMI, other television standards such as RCA or BNC can be used instead.

Figure 5:
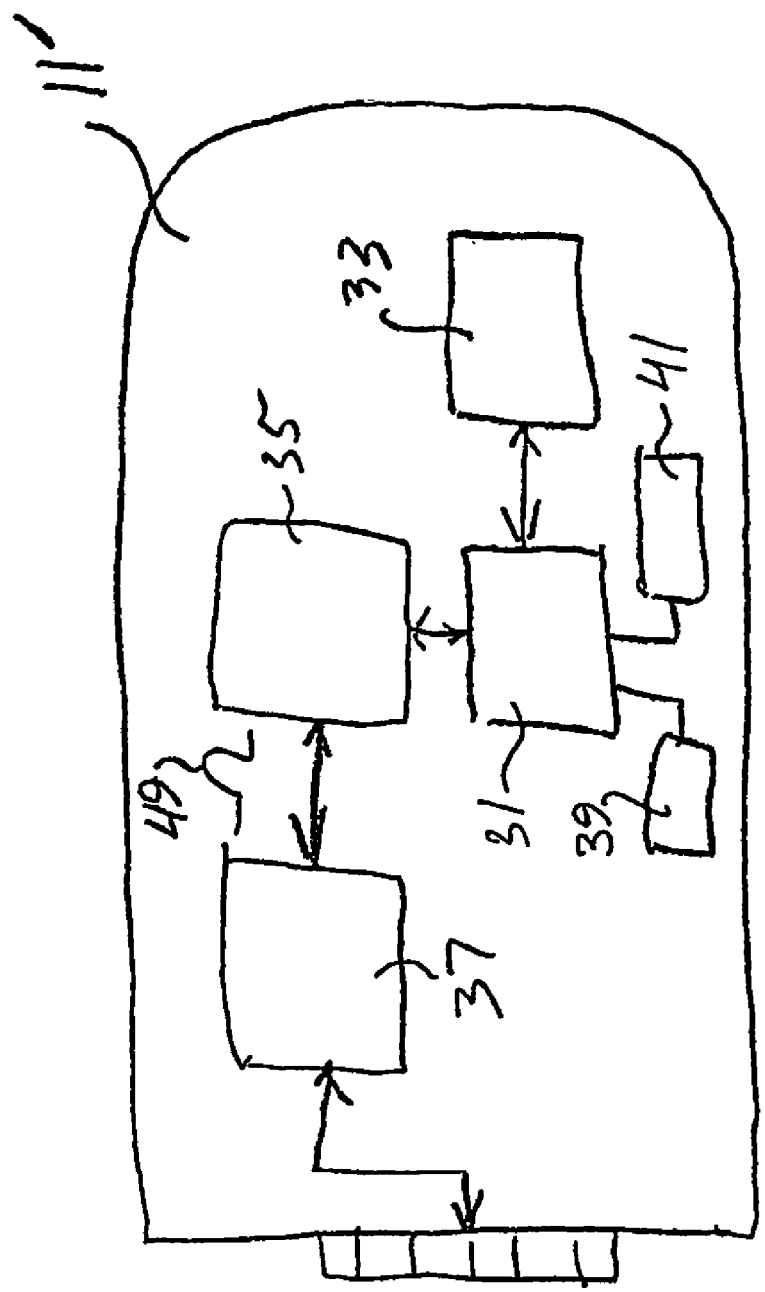
FIG. 5 shows an alternative configuration of the portable storage device for use with HDMI.

When the controller is an HDMI interface, the portable storage device can optionally be configured as shown by the HDMI portable storage device 11' in FIG. 5. As can be seen, the data signal 49 passes directly to/from the encoder/decoder engine 35 rather than being routed through the microcontroller unit 31.

Also, in the embodiment in which the first video system 17 is a computer, the second video system 21 can be a television having an HDMI connector. Then the second video system connector 55 is an HDMI connector, the video signals of the second type 23 are HDMI protocol signals, the signal connection 29 between the interface section and the second video system connector is comprised of an HDMI connector 53 mounted on the interface section 25 for direct connection to the second video system connector 55, and the interface section 25 converts between the USB and HDMI protocol signals. Additionally, the protocol controllers 37, 43 are USB controllers and the protocol controller 45 is an HDMI interface. For this USB/HDMI configuration, during playback to the television from the portable storage device 10, the USB controller 43 converts the USB signals 15 to USB interface protocol signals 59. Next, the interface section microcontroller unit 47 converts the USB interface protocol signals 59 to HDMI interface protocol signals 57. The HDMI interface 45 then converts the HDMI interface protocol signals 57 to HDMI signals 23. For recording from the television to the portable storage device 10 the process is reversed.

The invention claimed is:

1. An apparatus for recording and playing back video signals, the apparatus comprising:
   a) a portable storage device having:
   i) a USB male-type connector adapted to transfer USB protocol video signals and which is mounted on the portable storage device, the USP male-type connector being for direct connection to a computer having a USB female-type video system connector for directly connecting to the USB male-type connector of the portable storage device to exchange the USB protocol video signals between the portable storage device and the computer to record and playback the USB protocol video signals;
   ii) a built-in encoder-and-decoder engine for encoding the USB protocol video signals into compressed video data and for decoding the compressed video data into the USB protocol video signals;
   iii) a non-volatile solid-state memory for storing the compressed video data; and
   iv) a built-in microcontroller for sending the compressed video data to and receiving the compressed video data from the non-volatile solid-state memory; and
   b) an interface section having a USB female-type interface section connector for directly connecting to the USB male-type connector of the portable storage device, the interface section being for converting the USB protocol video signals to HDMI protocol signals, so that the apparatus is operable to exchange the USB protocol video signals and the HDMI protocol video signals between the computer and a television through the USB male-type connector of the portable storage device and a signal connection between the interface section and the television, the television being for receiving the converted HDMI protocol video signals.

2. The apparatus of claim 1, wherein the USB protocol video signals and the HDMI protocol video signals also include audio signals which are recorded and played back by the apparatus.

3. The apparatus of claim 1, wherein the non-volatile solid-state memory comprises at least 8 MB of memory capacity.

4. The apparatus of claim 1, wherein the portable storage device further comprises a protocol controller for converting the USB protocol video signals into a data signal.

5. The apparatus of claim 4 wherein the built-in encoder/decoder engine, the built-in microcontroller, and the protocol controller are operable to work in cooperation to convert the USB protocol video signals into compressed video data, the format of the compressed video data being selected from the set consisting of: MPEG 1, MPEG 2, MPEG 4, MP3, MPEG 7 and MPEG 21.

6. The apparatus of claim 5, wherein the built-in encoder/decoder engine is programmable by the computer to encode/decode different compressed data formats.

7. The apparatus of claim 1, wherein the signal connection between the interface section and the television further comprises a HDMI interface section connector mounted to the interface section, the HDMI interface section connector being for direct connection to a video system HDMI connector mounted to the television for exchanging the signals of the second type through the HDMI interface section connector and the video system HDMI connector.

8. The apparatus of claim 1, wherein the interface section further comprises an interface section microcontroller for converting between the USB and HDMI protocol signals and wherein the interface section microcontroller is electrically connected between a USB controller connected to the USB female-type interface section connector and an HDMI controller connected to the HDMI interface section connector.

9. The apparatus of claim 1, wherein the interface section is integral with the television.

10. The apparatus of claim 1, wherein the interface section is integral with the portable storage device.

11. The apparatus of claim 1, wherein the portable storage device, when in use, is not in signal communication with both the computer and the television.

12. The apparatus of claim 1, wherein the interface section is encased in a housing separate from the portable storage device.

13. The apparatus of claim 1, further comprising a biometrics-based authentication module coupled to and controlled by the built-in microcontroller, wherein access to the non-volatile memory is granted to a user provided that the biometrics-based authentication module authenticates the user's identity and wherein access to the non-volatile memory is denied to the user otherwise.

14. The apparatus of claim 13, wherein the biometrics-based authentication module includes a thumbprint sensor for acquiring data from the thumbprint of the user.

15. The apparatus of claim 1, further comprising a key matrix coupled to the built-in microcontroller to allow a user to control the recording and playing back of the video signals.

16. A method for recording and playing back video signals comprising the steps of:
    directly connecting a USB male-type connector mounted on a portable storage device to a USB female-type video system connector of a computer;
    transferring USB protocol video signals from the computer to the portable storage device through the USB female-type video system connector of the computer and the USB male-type connector of the portable storage device;
    encoding the USB protocol video signals into compressed video data using an encoder engine built-into the portable storage device;
    storing the compressed video data in a memory section of the portable storage device to record the USB protocol video signals;
    disconnecting the USB male-type connector of the portable storage device from the USB female-type connector of the computer;
    directly connecting the USB male-type connector mounted on the portable storage device to a USB female-type interface section connector of an interface section;
    decoding the compressed video data into decoded video signals using a decoder engine built into the portable storage device;
    passing the USB protocol video signals through the USB male-type connector of the portable storage device and the USB female-type interface section connector into the interface section;
    converting the USB protocol video signals into HDMI protocol video signals by passing the signals through the interface section;
    passing the HDMI protocol video signals to a television through a signal connection between the interface section and the television; and
    playing back the video signals on the television.

17. The method of claim 16, wherein the signal connection between the interface section and the television comprises an HDMI interface connector mounted to the interface section for connecting directly to a HDMI video system connector mounted to the television to exchange the HDMI protocol video signals through the HDMI interface section connector and the HDMI video system connector of the television.

18. The method claim 17, wherein the USB protocol video signals and the HDMI protocol video signals also include audio signals which are recorded and played back by the device.

19. The method of claim 18 wherein the portable storage device comprises at least 8 MB of non-volatile solid-state memory storing video data in compressed format and a built-in encoder/decoder engine for compressing and decompressing the video data.

20. The method of claim 19, wherein the portable storage device further comprises a built-in microcontroller for controlling the solid-state memory and a protocol controller for converting the video data to and from USB protocol video signals.

21. The method of claim 20, wherein:
    the signal connection between the interface section and the HDMI video system connector is comprised of an HDMI connector mounted on the interface section for direct connection to the HDMI video system connector; and
    the interface section converts between the USB and HDMI protocol signals.

22. The method of claim 21, wherein the interface section comprises an interface section microcontroller for converting between the USB and HDMI protocol signals and wherein the interface section microcontroller is electrically connected between a USB controller connected to the USB female-type interface section connector of the first type and an HDMI controller connected to the HDMI connector mounted on the interface section.

23. The method of claim 20, wherein the interface section is integral with the television.

24. The method of claim 20, wherein the interface section is integral with the portable storage device.

25. The method of claim 20, wherein the portable storage device, when in use, is not in signal communication with both the computer and the televsion.

26. The method of claim 20, wherein the interface section is encased in a housing separate from the portable storage device.

27. The method of claim 19, further comprising the step of:
    granting a user access to the non-volatile memory based upon authentication of the identity of the user by a biometrics-based authentication module coupled to and controlled by the built-in microcontroller; and
    denying the user access to the non-volatile memory otherwise.

28. The method of claim 27, wherein the biometrics-based authentication module includes a thumbprint sensor for acquiring data from the thumbprint of the user.

29. The method of claim 19, further comprising the step of controlling the recording and playing back of the video signals using a key matrix coupled to the built-in microcontroller.

30. The method of claim 18 wherein the portable storage device comprises at least 8 MB of non-volatile solid-state memory storing the video data in compressed format, a built-in encoder/decoder engine, the built-in microcontroller, and a protocol controller working in cooperation to convert the video data between the compressed format and USB protocol video signals, the format of the compressed data selected from the set consisting of: MPEG 1, MPEG 2, MPEG 4, MP3, MPEG 7 and MPEG 21.

31. The method of claim 30, wherein the built-in encoder/decoder engine is programmable by the computer to encode/decode different compressed data formats.

* * * * *